United States Patent [19]
Cipriano et al.

[11] Patent Number: 4,952,466
[45] Date of Patent: Aug. 28, 1990

[54] SOLID ELECTROLYTE BATTERY

[75] Inventors: Robert A. Cipriano, Lake Jackson; R. Vernon Snelgrove, Damon; Francis P. McCullough, Jr., Lake Jackson, all of Tex.

[73] Assignee: The Dow Chemical Company, Midland, Mich.

[21] Appl. No.: 265,650

[22] Filed: Nov. 1, 1988

Related U.S. Application Data

[63] Continuation-in-part of Ser. No. 250,789, Sep. 28, 1988, U.S. Pat. 4,866,715, which is a continuation-in-part of Ser. No. 4,003, Jan. 16, 1987, which is a continuation-in-part of Ser. No. 3,974, Jan. 16, 1987.

[51] Int. Cl.$^5$ ............................................. H01M 6/20
[52] U.S. Cl. .................................... 429/104; 429/192; 429/218
[58] Field of Search ............... 429/102, 104, 192, 249, 429/251, 112, 101, 218, 131, 136, 199; 252/62.2; 204/296, 421

[56] References Cited

U.S. PATENT DOCUMENTS

| | | |
|---|---|---|
| 4,520,086 | 5/1985 | Skotheim ............................ 429/192 |
| 4,722,877 | 2/1988 | Sammells ............................ 429/192 |
| 4,792,504 | 12/1988 | Schwab et al. ...................... 429/192 |
| 4,794,059 | 12/1988 | Hope et al. ......................... 429/192 |
| 4,844,995 | 7/1989 | Noda et al. ......................... 429/189 |
| 4,849,311 | 7/1989 | Itoh et al. ............................ 429/192 |

Primary Examiner—Anthony Skapars

[57] ABSTRACT

An electric storage device comprising an anode, a cathode and an electrolyte comprising a functionalized polymeric material, and a novel electrolyte.

11 Claims, 2 Drawing Sheets

SOLID ELECTROLYTE BATTERY

RELATED APPLICATION

This application is a continuation-in-part of application Ser. No. 250,789 filed Sept. 28, 1988, of McCullough et al, which is a continuation-in-part of application Ser. No. 004,003, filed Jan. 16, 1987, and application Ser. No. 003,974, filed Jan. 16, 1987, of McCullough et al.

FIELD OF THE INVENTION

The present invention relates to novel solid polymeric electrolytes and to primary energy storage devices containing the electrolytes. More particularly, the invention is concerned with a solid functionalized polymeric electrolyte and to primary rechargeable energy storage devices with such electrolytes.

BACKGROUND OF THE INVENTION

The combination of relatively high theoretical energy density, potentially long life, and low cost materials such as reported in the sodium-sulfur system high temperature batteries has been reported in the literature as suitable for low rate performance work such as electric road vehicle propulsion or load leveling of electric power supplies. The sodium-sulfur systems, first proposed in 1966, has had a great deal of effort expended in trying to develop a practical system. The basic operating principle involves the separation of two active molten materials, sodium and sulfur, by either a ceramic membrane of beta alumina or sodium glass, which at about 300° C. or higher allows the passage of sodium ions that form with the sulfur any of the several polysulfides. The open circuit voltage of the system is at just over 2 volts, about the same as the lead-acid cell. Two formidable problems exist at the present time, viz., cracking of the separator and corrosion of the casing and seal.

Another somewhat similar system is the lithium-iron sulfide system, operating at about 450° C. However, insufficient development has been done to date to demonstrate the widespread practicality of this system.

Another of the developments being pursued involves a lithium-based cell, in which the negative electrode is a lithium alloy (typically either lithium-aluminum or lithium-silicon), the positive electrode is an iron sulfide, and the electrolyte is a molten salt, such as the eutectic composition in the lithium chloride-potassium chloride system. Because of the high melting point of such salts, such cells must be operated in the temperature range of 400–500 degrees centigrade.

This requirement to operate at such high temperatures has several important disadvantages. One of these is that various degradation processes, such as corrosion of the cell container, seals, and other components are accelerated by from such cells is lower at elevated temperatures, due to the fundamental property of the negative temperature dependence of the free energy of the cell reaction. Furthermore, the higher the temperature of operation, the greater the potential problems related to damage to the cell during cooling to ambient temperature and reheating, whether deliberate or inadvertent. Differences in thermal expansion, as well as dimensional changes accompanying phase changes, such as the freezing of the molten salt, can cause severe mechanical distortions, and therefore damage to cell components.

Cells involving a lower temperature molten salt electrolyte have been investigated where the molten salt is based upon a solution of aluminum chloride and an alkali metal chloride. However, such salts are not stable in the presence of the respective alkali metals. As a result, an auxiliary solid electrolyte must be used to separate the alkali metal and the salt. One example of such a cell involves a molten sodium negative electrode, a solid electrolyte of sodium beta alumina, a molten aluminum chloride-sodium chloride salt, and either antimony chloride or an oxychloride dissolved in the chloride salt as the positive electrode reactant.

Such a cell can operate in the temperature range 150–250 degrees centigrade. It has the disadvantage of having to employ an electrolyte, which increases the cell impedance, as well as adding to the cost and complexity.

U.S. Pat. Nos. 4,303,748 and 4,620,944 to Armand et al have disclosed the use of macromolecular material of ionic conduction constituted by a salt in solution in a polyether as electrolyte and/or electrode material.

U.S. Pat. No. 3,844,837 to Bennion et al discloses a nonaqueous battery in which the anode may be lithium and/or graphite on which lithium metal is deposited and as a positive electrode a platinum cup filled with powdered $K_2SO_4$ and graphite is utilized. The electrolytes disclosed are $LiClO_4$, $LiCF_3SO_3$ or $LiBF_4$ dissolved in dimethyl sulfite.

SUMMARY OF THE INVENTION

In accordance with the present invention there is provided a novel solid polymeric electrolyte and a primary-rechargeable storage device having at least one cell positioned in the housing together with said electrolyte. The cell comprises a pair of electroconductive electrodes electrically insulated from contact and the novel solid polymeric electrolyte of the invention.

The cathode or positive electrode may comprise a carbonaceous electrically conductive fibrous or sheet material, graphite, any of the conventional metal or metal oxide electrodes, for example zinc, cadmium, aluminum, platinum, etc. Preferably, the cathode comprises fibrous carbonaceous material which is associated with a current collector. Advantageously, the carbonaceous material comprises an activated carbon fabric.

The anode or negative electrode may comprise an alkaline earth or alkali metal, exemplified by calcium, potassium, strontium, lithium, potassium, and sodium, as well as low melting alloys and/or alkali eutectic mixtures thereof which contain the aforesaid alkali metals as the predominate constituent. Preferable of the eutectic mixtures are the lithium containing eutectics of Ca, Si, K, Ba, Ag, Zn and Al. The melting point of lithium is about 175° C. to 180° C.

A separator encapsulates the anode. The separator must be capable of transporting or passing ionic species, e.g., alkaline earth or alkali metal ions and electrically isolating the anode from the cathode. The encapsulated anode electrode is positioned within a housing which is capable of containing the metal anode in its molten state and is at least moisture impervious.

The electrolytes of the invention comprise solid functionalized polymeric materials. More particularly, the electrolytes of the invention are polymeric materials having a sulfonic acid group. The polymeric materials include polyolefins, for example, polyethylene, polypropylene, and polybutylene, polystyrene, divinylbenzene, styrene-divinyl benzene copolymers, halogenated hydrocarbons, for example, a fluorocarbon based polymer such as NAFION, sold by the DuPont Corporation, which is a persulfonic acid membrane.

The electrolytes of the invention include copolymers of fluorinated monomers containing the sulfonic functional groups with nonfunctional monomers such as tetrafluoroethylene, trifluoroethylene, vinylidene fluoride, chlorotrifluoroethylene, etc. Such polymers are preferably perfluorinated polymers prepared from perfluoro sulfonic monomers and tetrafluoroethylene. These polymers are described in U.S. Pat. No. 3,282,875, which is herein incorporated by reference.

The preferred electroconductive carbonaceous cathode material used in the invention is more fully described in copending application Ser. No. 558,239, entitled Energy Storage Device, filed Dec. 15, 1983, now abandoned and Ser. No. 678,186, entitled Secondary Electrical Energy Storage Device and an Electrode Therefore, filed Dec. 4, 1984, now U.S. Pat. No. 4,865,931 each by F. P. McCullough and A. F. Beale, which applications are incorporated herein by reference in their entirety. Simply, the preferred carbonaceous material is a fiber spun from stabilized polymeric material such as pitch based material or polyacrylonitrile based fibers. These fibers are stabilized by oxidation and thereafter made electroconductive by carbonization at temperatures of above 850° C., and preferably above 1700° C. Advantageously, the carbonaceous fibers have a Young's Modulus of greater than about one million psi, and preferably about five million psi. The upper limit for practical manufacturing is about 100 million psi, although as production techniques improve it may be possible to use a material which has a higher Young's Modulus. However, such material is at present considered to be much too brittle to withstand manufacture into electrodes, as well as, the rigors of use to which a battery may be subjected. The carbonaceous material should have sufficient strength to withstand the encapsulation without loss of electrical contact. Thus, one can employ a carbonaceous material defined in the foregoing application as well as many other forms of electroconductive carbons such as GRAFOIL when they are encapsulated in the manner hereinafter described.

The separator may be non-conductive carbonaceous fibers or a coated metallic screen of metals which include steel, silver, platinum, etc., for example having an inert coating of $Li_3N$ or a cationic polymer stable in the environment of use.

The carbonaceous electrode, when constructed as a cloth or sheet, includes an electron collector conductively associated with the carbonaceous fibers or sheet. The electrode conductor interface is preferably further protected by a material to insulate the collector and to substantially protect the electron collector from contact with the fluid electrolyte and its ions. The protective material must, of course, be unaffected by the electrolyte and its ions.

The current collector intimately contacts the carbonaceous material of the electrode. The carbonaceous material may be in the form of an assembly such as a planar cloth, sheet or felt. It is also envisioned that the electrode may be constructed in other shapes such as in the form of a cylindrical or tubular bundle of fibers. It is also apparent that an electrode in the form of a planar body of cloth, sheet or felt can be rolled up with a separator between the layers of the carbonaceous material, and with the opposed edges of the rolled up material, connected to a current collector. While copper metal has been used as a current collector, any electroconductive metal or alloy may be employed, such as, for example, silver, gold, nickel, platinum, cobalt, palladium, and alloys thereof. Likewise, while electrodeposition has been used in bonding a metal or metal alloy to the carbonaceous material, other coating techniques (including melt applications) or electroless deposition methods may be employed.

Suitable techniques for preparing the collector/carbonaceous material negative electrode are more fully described in co-pending application Ser. No. 729,702, entitled Improved Low Resistance Collector Frame for Electro-conductive Organic and Graphitic Materials, filed May 2, 1985, by F. P. McCullough and R. V. Snelgrove, now U.S. Pat. No. 4,631,116.

BRIEF DESCRIPTION OF THE DRAWINGS

The present invention will be better understood from the following description of preferred embodiments of the invention together with the accompanying drawings wherein.

DETAILED DESCRIPTION OF THE PREFERRED EMBODIMENTS

Figure 1:
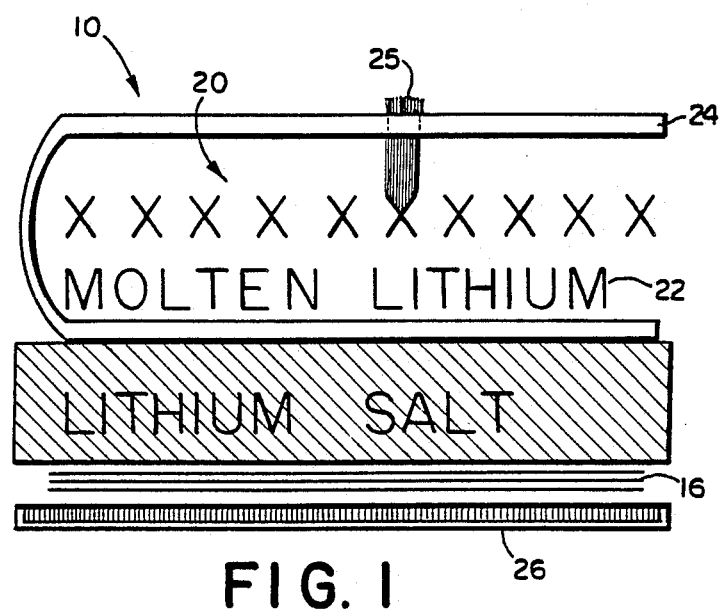
FIG. 1 is a schematic side elevational view, in cross-section, of an embodiment of the invention.

Referring to FIG. 1, a cell 10 within a housing (not shown) includes an anode assembly comprising an expanded metal matrix 20 in which an alkali metal or alkaline earth metal, for example, lithium 22 in the liquid state is retained.

A separator 24 encloses the anode assembly with a bipolar connector 25 passing through the separator 24. The separator 24 preferably comprises acationic polymer, $Li_3N$ or $Li_3N$ on a metallic screen, for example a carbon steel screen.

The cathode comprises a graphite cloth 16 that is placed adjacent a bipolar plate 26, which is preferably aluminum. The cloth advantageously has a bulk density which is normally expected for carbon fibers. Also included is an electrolyte comprising NAFION, a functionalized fluorocarbon.

In order to bring the battery to its operating temperature when the anode is a metal such as lithium, which is about 200° C. to 300° C., there is provided a heater (not shown).

Figure 2:
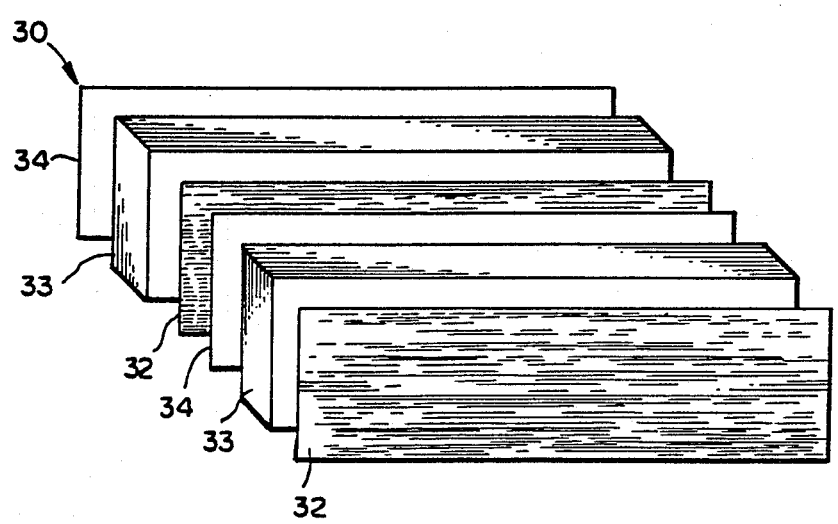
FIG. 2 is a partially broken away view of a flat plate multi-cell bipolar battery of the invention.

In order to keep the internal resistance and the battery weight low, the battery 30 comprising bipolar thin plates as shown in FIG. 2. FIG. 2 illustrates a multi-cell assembly 30 showing two series connected cells separated by a bipolar plate connector 32 which is a 0.003| thick aluminum. The density of the aluminum is about 2.7 g/cc. It is to be understood that the assembly 30 can include any number of cell units by use of additional bipolar separators and cell units. The assembly 30 includes cathode and anode plates 33 and 34. The anode 34 comprises a steel screen coated with 2.5 times the stoichrometric amount of lithium metal encased in a NAFION film solid electrolyte.

The cathode plate 33 comprises a 0.08 cm thick graphite cloth electrode having a bulk density of about 0.645 g/cc.

It is understood that the units are physically bonded to each other so as to become a unitary structure.

Energy devices which are contained in fluid-tight housings are generally known in the art. Such housings may be suitably employed in the present invention as long as the housing material is preferably electrically non-conductive or at least insulated from contact with one electrode and is impervious to gases and/or moisture (water or water vapor).

Housing materials which may be utilized are the conventional housing systems for high temperature batteries which include metallic, ceramic, and composites of the two groups, and the like.

In addition to being compatible, a housing material may also offer an absolute barrier (less than about 0.2 grams of $H_2O/yr/ft^2$ or 0.02 grams of $H_2O/yr/m^2$) against the transmission of water vapor from the external environment of the housing in order to prolong life. No presently known thermoplastic materials alone offers this absolute barrier against moisture at a thickness which would be useful for a battery housing. At present only metals, for example aluminum or steel, offer an absolute barrier against moisture at foil thicknesses. Aluminum foil having a thickness of greater than 0.0015 in. (0.038 mm) has been shown to be essentially impervious to water vapor transmission. It has also been shown that when laminated to other materials, aluminum foil as thin as 0.00035 in. (0.009 mm) can provide adequate protection against water vapor transmission. Suitable housings made of metal-plastic laminate, CED-epoxy-coated metal (cathodic electro deposited), or metal with an internal liner of plastic or glass presently satisfies the requirements for both chemical compatability and moisture barrier ability. Most of the cells and batteries built to date have been tested in either a dry box having a $H_2O$ level of 5 ppm, a glass cell or a double walled housing with the space between the walls filled with an activated molecular sieve, e.g. 5A zeolite.

The following example is a beaker cell experiment to demonstrate the principles of the present invention.

EXAMPLE

A single strand of yarn taken from a woven Panex PWB-6 cloth which had been stabilized, woven and carbonized by the manufacturer was pressed between two sheets of a sulfonyl fluoride form of a fluorinated polymeric membrane material under about ½ ton pressure. This laminate was hydrolyzed with an aqueous 20% sodium hydroxide solution for 24 hours at 90° C. The so hydrolyzed laminate was dried at 100° C. under 20 inches of vacuum for 48 hours, then placed in an evacuatable anti-chamber of an argon filled glove-box maintained under 30 inches vacuum at 50° C. for 48 hours. Thereafter a cell was assembled in the dry box by placing the laminate into molten lithium contained in a nickel crucible over a 180° C. hot plate. The laminate was held under the surface of the molten lithium by a small insulated clamp. A pair of alligator clips were attached one to the assembly and the other to the crucible. An open current voltage of 2.5 volts was measured. A micro amp current flowed for several minutes. The membrane laminate was removed from the molten lithium in order to examine the surface of the membrane. Visual examination showed the membrane surface slightly etched, but showed no significant degradation.

Over 30 free-thaw experiments were performed with no loss of capacity. The cell, frozen at partial state of charge, retains that capacity until reheated and discharged.

The electrode reactions in the battery of the invention are:

Anode: 
Cathode: 

Voltage of the cell couple generally varies from 2.56V at C+Li to 2.26V as the cell discharges to a cathode composition of $C_6Li$.

Lithium metal pressed into an expanded metal mesh is used for the preferred batteries of the invention. The graphite fiber electrode, in the form of woven graphite cloth is preferably prepared as disclosed in application Ser. No. 678,186.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A primary rechargeable electrical storage device comprising a housing, at least one cell position in said housing, each cell comprising an anode consisting of a metal selected from the group consisting of alkaline earth metal, alkaline earth metal alloy, alkali metal, alkali metal alloy and alkali metal eutectic mixtures, a separator surrounding said anode, said separator being capable of transporting or passing ionic species and electrically isolating said anode, a cathode, and an electrolyte associated with said cathode, said electrolyte comprising a membrane of a non-porous solid polymeric material containing a sulfonic acid group.

2. The storage device of claim 1, wherein said polymeric material is a halogenated hydrocarbon.

3. The storage device of claim 1, wherein said polymeric material is a fluorinated hydrocarbon.

4. The storage device of claim 1, wherein said polymeric material is selected from the group consisting of polyolefin, polystyrene, divinylbenzene and styrene-divinylbenzene copolymer.

5. The storage device of claim 1, wherein said polymeric material is a perfluorinated polymer prepared from a perfluoro sulfonic monomer.

6. The storage device of claim 1, wherein said cathode comprises an electrically conductive carbonaceous material.

7. The storage device of claim 6, wherein said carbonaceous material comprises activated carbon fibers.

8. The storage device of claim 1, wherein said anode comprises a metal selected from the group consisting of alkaline earth metal, alkaline earth metal alloy, alkali metal, alkaline metal alloy, an alkali metal eutectic mixture thereof.

9. The storage device of claim 1, wherein said anode comprises lithium.

10. A primary rechargeable electrical storage device comprising a housing, at least one cell positioned in said housing, each cell comprising an anode consisting of a metal selected from the group consisting of alkaline earth metal, alkaline earth metal alloy, alkali metal, alkali metal alloy and alkali metal eutectic mixtures, a separator surrounding said anode, said separator being capable of transporting or passing ionic species and electrically isolating said anode, a cathode comprising an electrically conductive carbonaceous material, and an electrolyte associated with said cathode, said electrolyte comprising a non-porous membrane of a polymeric material containing a sulfonic acid group.

11. The electric storage device of claim 10, wherein said electrolyte is a halogenated hydrocarbon having a sulfonic acid group.

* * * * *